United States Patent
Higa et al.

(10) Patent No.: US 8,094,267 B2
(45) Date of Patent: Jan. 10, 2012

(54) LIQUID CRYSTAL DISPLAY DEVICE, METHODS FOR MANUFACTURING THE SAME, AND ELECTRONIC APPARATUS

(75) Inventors: Masakatsu Higa, Chino (JP); Hitoshi Tsuchiya, Suwa (JP)

(73) Assignee: Sony Corporation, Tokyo (JP)

( * ) Notice: Subject to any disclaimer, the term of this patent is extended or adjusted under 35 U.S.C. 154(b) by 404 days.

(21) Appl. No.: 11/657,037

(22) Filed: Jan. 24, 2007

(65) Prior Publication Data

US 2007/0182892 A1    Aug. 9, 2007

(30) Foreign Application Priority Data

Feb. 7, 2006 (JP) ................................. 2006-029340

(51) Int. Cl.
*G02F 1/1335* (2006.01)
*G02F 1/1333* (2006.01)
*G02F 1/1343* (2006.01)

(52) U.S. Cl. ......... 349/114; 349/117; 349/122; 349/141

(58) Field of Classification Search .................. 349/114, 349/117, 122, 141
See application file for complete search history.

(56) References Cited

U.S. PATENT DOCUMENTS

| | | | |
|---|---|---|---|
| 7,088,409 B2 * | 8/2006 | Itou et al. ...................... | 349/114 |
| 2004/0105059 A1 * | 6/2004 | Ohyama et al. ............... | 349/114 |
| 2006/0012737 A1 * | 1/2006 | Hirai et al. .................... | 349/114 |
| 2006/0187388 A1 * | 8/2006 | Ohyama et al. ............... | 349/114 |
| 2006/0192912 A1 | 8/2006 | Itou et al. | |

FOREIGN PATENT DOCUMENTS

| | | |
|---|---|---|
| JP | A 2003-344837 | 12/2003 |
| JP | A-2004-133179 | 4/2004 |
| JP | A-2004-226829 | 8/2004 |
| JP | A-2005-338256 | 12/2005 |
| WO | WO 2006/010431 A1 | 2/2006 |

OTHER PUBLICATIONS

M. O. Choi et al., "A Single Gap Transflective Display using a Fringe-Field Driven Homogeneously Aligned Nematic Liquid Crystal Display," School of Advanced Materials Engineering, Chonbuk National University, Chonju-si, Korea; pp. 719-721, 2005.
Y. H. Jeong et al., "Voltage and Rubbing Angle Dependent Behavior of the Single Cell Gap Transflective Fringe Field Switching (FFS) Mode," SBU Development Center, BOE TFT-LCD SBU, Ichon-si, Gyeonggi-do, Korea; pp. 723-725, 2005.
Gak Seok Lee et al., "Optimization of Electrode Structure for Single Gamma in a Transflective IPS LCD," Dept. of Electronics, Pusan National University, Busan, Korea; pp. 738-741, 2005.

* cited by examiner

*Primary Examiner* — Nathanael R Briggs
(74) *Attorney, Agent, or Firm* — K&L Gates LLP (57) ABSTRACT

A liquid crystal display device whose sub-pixel region has a reflective display region that displays an image in a reflective mode and a transmissive display region that displays an image in a transmissive mode includes a first substrate, a second substrate opposing the first substrate; and a liquid crystal layer between the first substrate and the second substrate. The liquid crystal layer has a smaller thickness in the reflective display region than in the transmissive display region. One of the first substrate and the second substrate includes a reflection layer in the reflective display region, and the other substrate includes on the liquid crystal layer side a functional resin layer having a first functional resin sub layer in the reflective display region and a second functional resin sub layer in the transmissive display region. The first functional resin sub layer and the second functional resin sub layer serve as retardation layers with different optical axes from each other.

5 Claims, 6 Drawing Sheets

LIQUID CRYSTAL DISPLAY DEVICE, METHODS FOR MANUFACTURING THE SAME, AND ELECTRONIC APPARATUS

BACKGROUND

1. Technical Field

The present invention relates to a liquid crystal display device, a method for manufacturing the liquid crystal display device, and an electronic apparatus.

2. Related Art

A known type of liquid crystal display device employs the technique in which an electric field is applied to the liquid crystal layer in the direction parallel to the surface of the substrate to control the orientation of the liquid crystal molecules. This type (hereinafter referred to as transverse electric field type) may be called IPS (In-Plane Switching) type or FFS (Fringe-Field Switching) type because of the form of the electrodes that apply the electric field to the liquid crystal layer. Transverse electric field type transflective liquid crystal display devices are studied in these years.

For example, JP-UM-A-2003-344837 discloses a transverse electric field type transflective liquid crystal display device in which circularly polarized light necessary for displaying black in the reflective mode is controlled by Δnd of the liquid crystal layer. Another transverse electric field type that displays black in the reflective mode by using a retardation layer formed on the liquid crystal layer side of the lower substrate is reported, for example, in "A Single Gap Transflective Display using a Fringe-field Driven Homogeneously Aligned Nematic Liquid Crystal Display", M. O. Choi et al., SID05 DIGEST, pp. 719-721 (2005); "Voltage and Rubbing Angle Dependent Behavior of the Single Cell Gap Transflective Fringe Field Switching (FFS) Mode", Y. H. Jeong et al., SID05 DIGEST, pp. 723-725; and "Optimization of Electrode Structure for Single Gamma in a Transflective IPS LCD", Gak Seok Lee et al., SID05 DIGEST, pp. 738-741.

Unfortunately, the techniques described in the known documents above produce stains in the reflectively displayed black due to the wavelength dispersion characteristics of the materials of the liquid crystal and the retardation layer. It is therefore difficult to display high-contrast images. In addition, the devices of the above three non-patent documents have another retardation layer in the transmissive display region, and accordingly require a retardation film on the outer surface of the substrate. This disadvantageously reduces the viewing angle in the transmissive mode.

These problems occur not only in the transverse electric field type, but also in the vertical electric field type, in which an electric field is applied in the direction perpendicular to the substrate to control the orientation of the liquid crystal molecules.

SUMMARY

An advantage of some aspects of the invention is that it provides a liquid crystal display device that can display high-contrast images with less stain in the reflective mode and can also display high-contrast images with a wide viewing angle in the transmissive mode, and a method for manufacturing the same. Another advantage is that it provides an electronic apparatus that includes the liquid crystal display device and accordingly displays high-quality images.

According to an aspect of the invention, a liquid crystal display device is provided whose sub-pixel region has a reflective display region that displays an image in a reflective mode and a transmissive display region that displays an image in a transmissive mode. The liquid crystal display device includes a first substrate, a second substrate opposing the first substrate, and a liquid crystal layer between the first substrate and the second substrate. The liquid crystal layer has a smaller thickness in the reflective display region than in the transmissive display region. One of the first and second substrates includes a reflection layer in the reflective display region, and the other substrate includes on the liquid crystal layer side a functional resin layer having a first functional resin sub layer in the reflective display region and a second functional resin sub layer in the transmissive display region. The first functional resin sub layer and the second functional resin sub layer serve as retardation layers with different optical axes from each other.

This structure allows the first functional resin sub layer and the liquid crystal layer to convert incident light into board-band circularly polarized light in the reflective display mode. Consequently, black with less stain can be displayed in the reflective mode; hence high-contrast images can be displayed in the reflective mode. For the transmissive mode, the second functional resin sub layer has a different optical axis from the first functional resin sub layer. This means that an optimal optical design can be made for transmissive displaying, differing from the design for reflective displaying. Thus, high-contrast images with a wide-viewing angle can be displayed in the transmissive mode. In addition, since the thickness of the liquid crystal layer in the reflective display region is set smaller than that in the transmissive display region, the electrooptical characteristics can be matched between the transmissive mode and the reflective mode. As a result, the liquid crystal display device can display high-quality images in both modes.

The reflective display region mentioned herein refers to the region of the substrate coincides with the so-called reflective display region when viewed from above. The transmissive display region mentioned herein also refers to the region of the substrate coincides with the so-called transmissive display region when viewed from above.

The substrate including the functional resin layer may have a polarizer opposite the liquid crystal layer, and preferably, the optical axis of the second functional resin sub layer extends in a direction substantially parallel or substantially perpendicular to the transmission axis of the polarizer.

This structure, in the transmissive mode, can prevent light transmitted through the functional resin layer from having undesired phase difference that may reduce the contrast, and thus allows high-contrast images with a wide viewing angle to be displayed in the transmissive mode.

Preferably, the first functional resin sub layer and the second functional resin sub layer are formed by polymerizing a polymerizable liquid crystal material in liquid crystal phases oriented in different directions from each other.

The functional resin layer can be formed by applying a polymerizable liquid crystal material for the functional resin layer onto an underlying alignment layer segmented by orientation. In this instance, the polymerizable liquid crystal material can be applied to both the transmissive display region and the reflective display region at one time in the same manner. Thus, the manufacturing process can be simpler than the case where the first and second functional resin sub layers are formed individually.

According to another aspect of the invention, a liquid crystal display device is provided whose sub-pixel region has a reflective display region that displays an image in a reflective mode and a transmissive display region that displays an image in a transmissive mode. The liquid crystal display device includes a first substrate, a second substrate opposing the first substrate, and a liquid crystal layer between the first substrate and the second substrate. The liquid crystal layer has a smaller thickness in the reflective display region than in the transmissive display region. One of the first and second substrates includes a reflection layer in the reflective display region, and the other substrate includes on the liquid crystal layer side a functional resin layer having a first functional resin sub layer in the reflective display region and a second functional resin sub layer in the transmissive display region. The second functional resin sub layer is isotropic with no phase difference and the first functional resin sub layer serves as a retardation layer with a phase difference.

This structure allows the first functional resin sub layer and the liquid crystal layer to convert incident light into broadband circularly polarized light in the reflective mode. Consequently, black with less stain can be displayed in the reflective mode, and thus high-contrast images can be displayed in the reflective mode. For the transmissive display mode, the second functional resin sub layer is isotropic with no phase difference. Thus, high-contrast images with a wide viewing angle can be displayed without causing light transmitted through the second functional resin sub layer to have undesired phase difference that may reduce the contrast.

Preferably, the first functional resin sub layer is formed by polymerizing a polymerizable liquid crystal material in a liquid crystal phase, and the second functional resin sub layer is formed by polymerizing the polymerizable liquid crystal material in an isotropic phase.

This functional resin layer can be formed by applying a polymerizable liquid crystal material onto an underlying alignment layer, and subsequently polymerizing the liquid crystal material in different manners between the transmissive display region and the reflective display region. In this instance, the polymerizable liquid crystal material can be applied to both the transmissive display region and the reflective display region at one time in the same manner. Thus, the manufacturing process can be simpler than the case where the first and second functional resin sub layers are formed individually.

Preferably, the first substrate includes a first electrode and a second electrode at the liquid crystal layer side that generate an electric field in between to drive the liquid crystal layer, and the second substrate has the functional resin layer.

The liquid crystal display device is of a transverse electric field type, in which liquid crystal molecules are aligned by applying an electric field in the direction of the substrate surface to the liquid crystal layer. This type of liquid crystal display device does not require that the second substrate has an electrode. By providing the functional resin layer in the second substrate, the deterioration of electrodes can be prevented which is caused during the formation of the functional resin layer, and thus the yield can be increased.

The first electrode and the second electrode each may have a plurality of strips, adjacently opposing each other in the same layer. For example, the first electrode and the second electrode each may be in a comb shape having rectangular teeth when viewed from above and the teeth or strips of the two electrodes are alternately arranged.

The second electrode may be spread substantially evenly in a plane while the first electrode has a plurality of strips. Specifically, the second electrode in a comb shape may overlie the first electrode in a relatively wide planar shape with a dielectric film in between.

In a transflective liquid crystal display device, a reflection layer for reflective displaying is partially formed in the sub-pixel region. Since the reflection layer is generally made of a metal film, the reflection layer may cause distortion in the electric field generated between the first electrode and the second electrode if the reflection layer lies in the same substrate with the first and second electrodes. On the other hand, a structure in which the reflection layer lies in the vicinity of the evenly spread first electrode does not cause distortion in the electric field. Thus, such a structure of the electrodes can simplify the structure of the liquid crystal display device and allow its easy manufacture.

Preferably, the liquid crystal layer in the reflective display region gives a phase difference of about $\lambda/4$ to incident light in an inactive state. Preferably, the functional resin layer in the reflective display region gives a phase difference of about $\lambda/2$ to incident light.

This structure allows light entering the reflective display region to be converted into broadband circularly polarized light, thus further increasing the contrast of reflectively displayed images.

According to another aspect of the invention, there is provided a method for manufacturing a liquid crystal display device whose sub-pixel region has a reflective display region displaying an image in a reflective mode and a transmissive display region displaying an image in a transmissive mode, the liquid crystal display device including a liquid crystal layer between a first substrate and a second substrate one of which includes a reflection layer in the reflective display region. The method includes forming a functional resin layer on the liquid crystal layer side of the substrate not including the reflection layer across both the transmissive display region and the reflective display region; and forming a liquid crystal layer thickness-adjusting layer in at least one of the first substrate and the second substrate so that the thickness of the liquid crystal layer in the reflective display region is set smaller than the thickness of the liquid crystal layer in the transmissive display region. The formation of the functional resin layer includes: forming an alignment layer in the transmissive display region and the reflective display region such that the orientations of the alignment layer differs between the transmissive display region and the reflective display region; and applying a polymerizable liquid crystal material for forming the functional resin layer onto the alignment layer in the transmissive display region and the reflective display region; and polymerizing the polymerizable liquid crystal material in a liquid crystal phase.

This method forms a functional resin layer whose optical axis differs between the reflective display region and the transmissive display region. Thus, the resulting liquid crystal display device can display high-contrast images with less stain in the reflective mode, and besides high-contrast images with a wide viewing angle in the transmissive mode. In addition, since the functional resin layer can be applied to both the transmissive display region and the reflective display region at one time in the same manner, the manufacturing process can be simpler than the case where different types of functional resin layer are formed individually.

According to another aspect of the invention, there is provided a method for manufacturing a liquid crystal display device whose sub-pixel region has a reflective display region that displays an image in a reflective mode and a transmissive display region that displays an image in a transmissive mode, the liquid crystal display device including a liquid crystal layer between a first substrate and a second substrate one of which includes a reflection layer in the reflective display region. The method includes forming a functional resin layer on the liquid crystal layer side of the substrate not including the reflection layer across both the transmissive display region and the reflective display region; and forming a liquid crystal layer thickness-adjusting layer in at least one of the first substrate and the second substrate so that the thickness of the liquid crystal layer in the reflective display region is set smaller than the thickness of the liquid crystal layer in the transmissive display region. The formation of the functional resin layer includes forming an alignment layer with the same orientation in the transmissive display region and the reflective display region; applying a polymerizable liquid crystal material for forming the functional resin layer onto the alignment layer in the transmissive display region and the reflective display region; polymerizing the polymerizable liquid crystal material in the reflective display region in a liquid crystal phase; and polymerizing the polymerizable liquid crystal material in the transmissive display region in an isotropic phase.

This method forms a functional resin layer serving as an isotropic layer in the transmissive display region and as a retardation layer in the reflective display region. Consequently, the resulting liquid crystal display device can display high-contrast images with less stain in the reflective display region, and besides high-contrast images with a wide viewing angle in the transmissive display region. In addition, since the functional resin layer can be applied to both the transmissive display region and the reflective display region at one time in the same manner, the manufacturing process can be simpler than the case where different types of functional resin layer are formed individually.

An electronic apparatus according to an aspect of the invention includes the liquid crystal display device.

This electronic apparatus has a high-contrast display region with a wide viewing angle.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A liquid crystal display device according to a first embodiment will now be described with reference to the drawings.

The liquid crystal display device of the present embodiment is of an FFS (Fringe Field Switching) type, which is a type of transverse electric field liquid crystal display devices in which an electric field is applied to the liquid crystal layer in the direction parallel to the surface of the substrate to control the orientation of the liquid crystal molecules. The liquid crystal display device of the present embodiment includes color filters on the substrate, and is hence a color liquid crystal display device. A pixel of the liquid crystal display device is defined by three sub-pixels emitting red (R), green (G), and blue (B) color lights respectively. Therefore, the minimum unit for forming an image is called a "sub-pixel region", and a display region defined by a set of the R, G, and B sub pixels is called a "pixel region".

Figure 1:
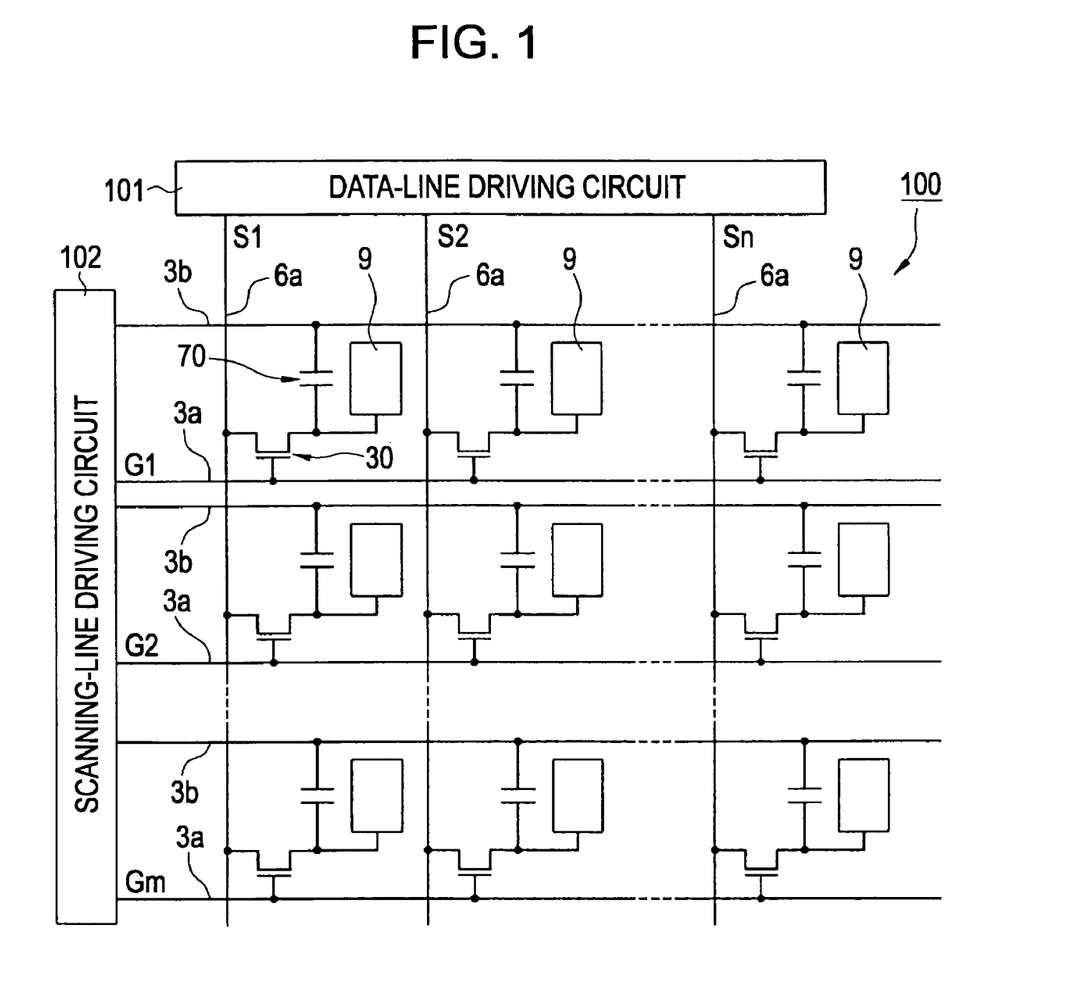
FIG. 1 is a schematic circuit diagram of a liquid crystal display device according to a first embodiment.
Figure 2A:
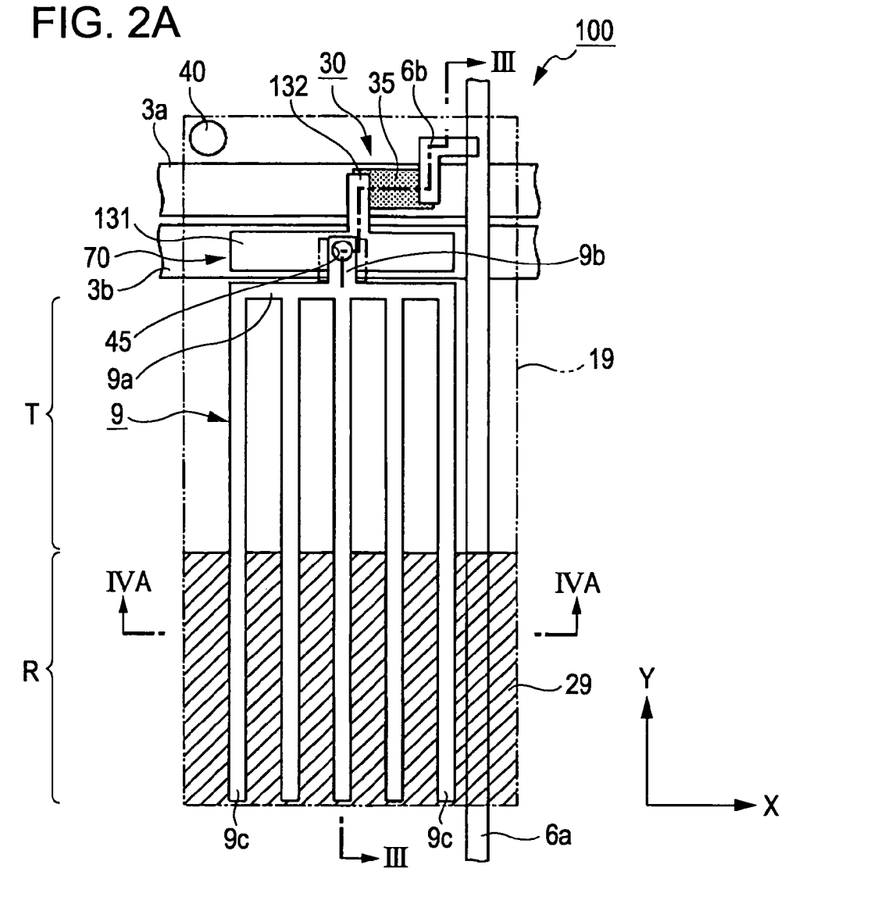
FIG. 2A is a plan view of a sub-pixel region of the liquid crystal display device.
Figure 2B:
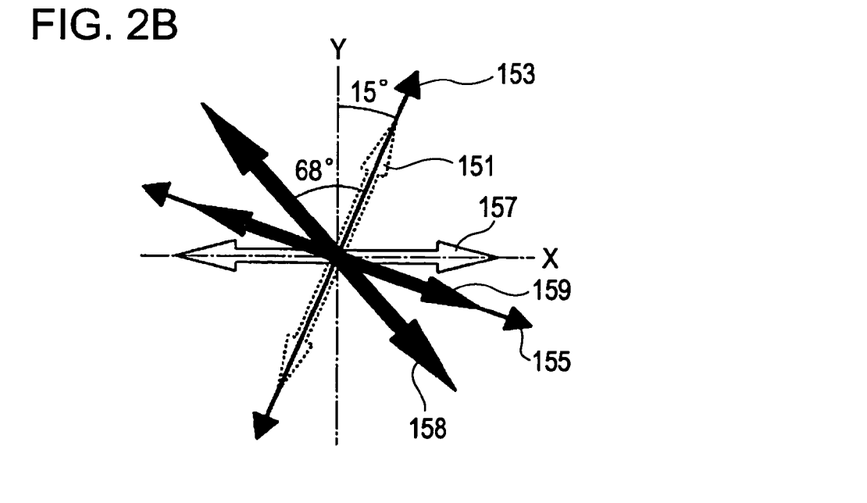
FIG. 2B is a representation of optical axes in the sub-pixel region shown in FIG. 2A.
Figure 3:
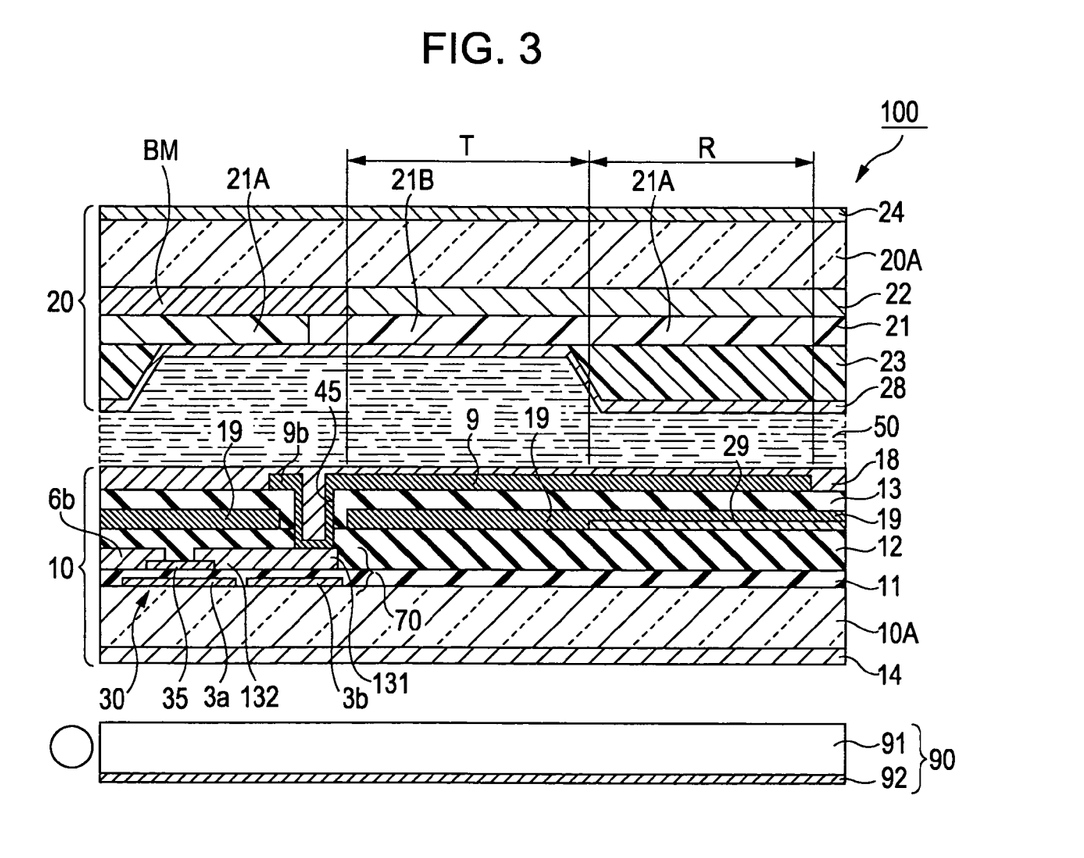
FIG. 3 is a fragmentary sectional view taken along line A-A' in FIG. 2A.
Figure 4A:
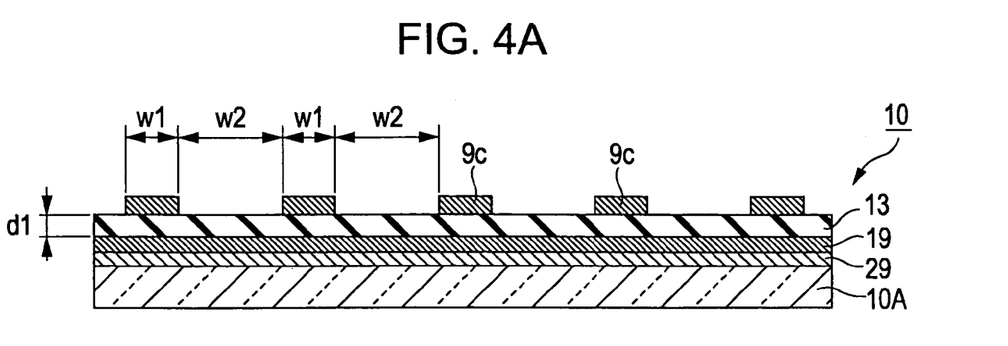
FIG. 4A is a schematic sectional view of a TFT array substrate taken along line B-B' in FIG. 2A.
Figure 4B:
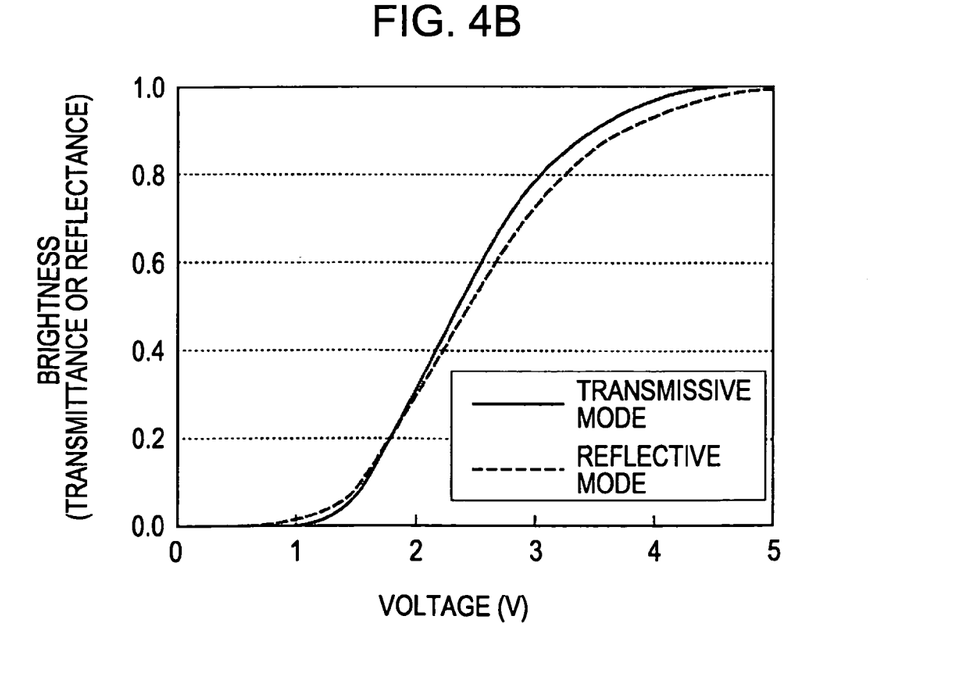
FIG. 4B is a representation of an effect of the first embodiment.

FIG. 1 is a schematic circuit diagram of the liquid crystal display device 100 of the present embodiment, showing a plurality of sub-pixel regions arranged in a matrix manner. FIG. 2A is a plan view of a sub-pixel region of the liquid crystal display device 100, and FIG. 2B is a representation of optical axes in the sub-pixel region shown in FIG. 2A. FIG. 3 is a fragmentary sectional view taken along line A-A' in FIG. 2A. FIG. 4A is a sectional view of a TFT array substrate taken along line B-B' in FIG. 2A, and FIG. 4B is a representation of an effect of the present embodiment. The layers and members in each figure are illustrated on different scales so as to be recognized.

As shown in FIG. 1, each of the sub-pixel regions arranged in a matrix manner to define the image display region of the liquid crystal display device 100 includes a pixel electrode 9 and a TFT 30 for controlling the pixel electrode 9 by switching, and the source of the TFT 30 is electrically connected to a data line 6a extending from a data line driving circuit 101. The data line driving circuit 101 provides image signals S1 to Sn to each pixel through the data lines 6a. The image signals S1 to Sn may be transmitted one after another in that order, or for each group consisting of adjacent plural data lines 6a.

The gate of the TFT 30 is electrically connected to a scanning line 3a extending from a scanning line driving circuit 102. The scanning line driving circuit 102 provides pulsed scanning signals G1 to Gm to the scanning lines 3a at a predetermined timing, and the scanning signals G1 to Gm are thus transmitted to the gates of the TFTs 30 one after another in that order. The pixel electrode 9 is electrically connected to the drain of the TFT 30. The TFT 30 serving as a switching element is turned on by receiving corresponding one of the scanning signals G1 to Gm and kept on for a predetermined period, and consequently the image signals S1 to Sn transmitted through the data lines 6a are written in the pixel electrodes 9 at a predetermined timing.

The image signals S1 to Sn at a predetermined level written in the liquid crystal through the pixel electrodes 9 are held for a certain period between the pixel electrodes 9 and an opposing common electrode with the liquid crystal in between. In order to prevent the held image signals from leaking, storage capacitors 70 are each connected in parallel to a liquid crystal capacitor disposed between the pixel electrode 9 and the common electrode. The storage capacitor 70 is disposed between the drain of the TFT 30 and a capacitor line 3b.

Turning now to FIG. 2A, each sub-pixel region of the liquid crystal display device 100 has the pixel electrode (first electrode) 9 formed in a comb shape whose longitudinal direction is parallel to the Y axis direction (the direction in which the data lines extend) when viewed from above, and the common electrode (second electrode) 19 spreads substantially evenly under the pixel electrode 9. In addition, a columnar spacer 40 is provided in the upper-left corner of the sub-pixel region in the figure (or between the adjacent sub-pixel regions) so that a TFT array substrate 10 and an opposing substrate 20 can keep away from each other at a predetermined distance.

The pixel electrode 9 includes a plurality of (five, in the figure) strips (branches) 9c extending in the Y direction; basic portion 9a electrically connected (short-circuited) to one end of each strip 9c at the upper side (+Y side) in the figure and extending in the X direction (direction in which the scanning lines 3a extend or direction perpendicular to the data lines 6a); and contact portion 9b protruding in the +Y direction from the middle in the x direction of the basic portion 9a.

The common electrode 19 is formed so as to cover a reflection layer 29 partially provided in the sub-pixel region as shown in FIG. 2A. The common electrode 19 in the present embodiment is made of a transparent electroconductive film, such as an ITO (indium tin oxide) film. The reflection layer 29 is made of a light-reflecting metal film, such as an aluminum or a silver film, or a dielectric composite film (dielectric mirror) constituted of dielectric films (for example, $SiO_2$ and $TiO_2$ films) having different refractive indices.

As an alternative to the form of the common electrode 19 covering the reflection layer 29 as in the present embodiment, it may have transparent portions made of a transparent electroconductive material and reflective portions made of a light-reflecting metal in a plane. More specifically, the common electrode 19 may includes transparent portions disposed corresponding to the transmissive display regions and reflective portions disposed corresponding to the reflective display regions, and the transparent portion and the reflective portion are electrically connected to each other between the transmissive display region and the reflective display region. In this instance, the reflective portion serves as the reflection layer of the corresponding sub-pixel region while the transparent portion and the reflective portion serve together as the common electrode that generates an electric field with the pixel electrode 9.

The sub-pixel region includes the data line 6a extending in the Y direction, the scanning line 3a extending in the X direction, and a capacitor line 3b extending along the scanning line 3a. The TFT 30 is disposed in the vicinity of the intersection of the data line 6a and the scanning line 3a. The TFT 30 includes a semiconductor layer 35 made of amorphous silicon in a part of the region coinciding with the scanning line 3a when viewed from above, and a source electrode 6b and a drain electrode 132 that overlap with the semiconductor layer 35. The scanning line 3a serves as the gate electrode of the TFT 30 at a position where the semiconductor layer 35 overlies the scanning line 3a.

The source electrode 6b of the TFT 30 is formed in an L shape in plan view diverging from the data line 6a and extending to the semiconductor layer 35. The drain electrode 132 extends in the −Y direction to be electrically connected to the capacitor electrode 131 formed in a rectangular shape in plan view. The contact portion 9b of the pixel electrode 9 protrudes over the capacitor electrode 131 from the −Y side and the pixel electrode 9 is electrically connected to the capacitor electrode 131 via a pixel contact hole 45 that is formed in the position where the contact portion 9b and the capacitor electrode 131 coincide with each other when viewed from above. The capacitor electrode 131 is located in the region coinciding with the capacitor line 3b when viewed from above, opposing the capacitor line 3b in the thickness direction. Thus, a storage capacitor 70 is defined using the capacitor electrode 131 and the capacitor line 3b as its electrodes.

Turning now to the sectional view FIG. 3, the liquid crystal display device 100 includes a TFT array substrate (first substrate) 10, an opposing substrate (second substrate) 20, and a liquid crystal layer 50 between the two substrates. The liquid crystal layer 50 is sealed between the TFT array substrate 10 and the opposing substrate 20 with a sealant (not shown) disposed along the edges of the two substrates. A backlight (illuminating device) 90 including an optical waveguide 91 and a reflector 92 is provided at the backside (lower side, in the figure) of the TFT array substrate 10.

The TFT array substrate 10 includes a base 10A made of glass, quartz, plastic, or the like; the scanning line 3a and capacitor line 3b on the inner side (liquid crystal layer 50 side) of the base 10A; and a gate insulating layer 11 covering the scanning line 3a and capacitor line 3b.

The semiconductor layer 35 is formed of amorphous silicon on the gate insulating layer, and the source electrode 6b and the drain electrode 132 are overlapped with the semiconductor layer 35. The capacitor electrode 131 is formed to the right of the drain electrode 132 in one body. The semiconductor layer 35 opposes the scanning line 3a with the gate insulating layer 11 in between, and the scanning line 3a serves as the gate electrode of the TFT 30 in this opposing region. The capacitor electrode 131 opposes the capacitor line 3b with the gate insulating layer 11 in between, and the storage capacitor 70 is located in this opposing region with the gate insulating layer 11 acting as the dielectric film of the storage capacitor 70.

A first insulating interlayer 12 is formed so as to cover the semiconductor layer 35, the source electrode 6b, the drain electrode 132, and the capacitor electrode 131, and the reflection layer 29 is formed on part of the first insulating interlayer 12. The reflection layer 29 and the first insulating interlayer 12 are covered with the common electrode 19 made of a transparent electroconductive material, such as ITO.

Thus, in the sub-pixel region shown in FIG. 2A of the liquid crystal display device 100, the region where the plane including the pixel electrode 9 and the common electrode 19 coincide with each other when viewed from above acts as the transmissive display region T that displays images by modulating light coming from the backlight 90 and transmitted through the liquid crystal layer 50, except for the region coincides with the reflection layer 29 when viewed from above. The region where the plane including the pixel electrode 9 and the reflection layer 29 coincide with each other when viewed from above acts as the reflective display region R that displays images by reflecting and modulating light coming through the opposing substrate 20 and transmitted through the liquid crystal layer 50.

The common electrode 19 is covered with a second insulating interlayer 13 made of silicon oxide or the like. The pixel electrode 9 made of ITO or any other transparent electroconductive material is disposed on the second insulating interlayer 13. The pixel electrode 9 and the second insulating interlayer 13 are covered with an alignment layer 18 made of polyimide, silicon oxide, or the like.

The pixel contact hole 45 is formed through the first insulating interlayer 12 and the second insulating interlayer 13 to reach the capacitor electrode 131. The contact portion 9b of the pixel electrode 9 is partially buried in the pixel contact hole 45 so that the pixel electrode 9 and the capacitor electrode 131 are electrically connected to each other. The common electrode 19 has a hole in the region corresponding to the pixel contact hole 45, and the pixel electrode 9 and the capacitor electrode 131 are electrically connected to each other inside the hole of the common electrode 19 while the common electrode 19 is prevented from short-circuiting with the pixel electrode 9.

The opposing substrate 20 includes a base 20A made of glass, quartz, plastic, or the like, and color filters 22 on the inner side (liquid crystal layer 50 side) of the base 20A. The color filters 22 have plural types of colored layer with their respective colors, and are separated from each other by a black matrix 22BM made of, for example, a black resin.

Each color filter 22 is mainly composed of a color material layer for the color displayed in the corresponding sub-pixel region, and may be segmented in the sub-pixel region into at least two portions having different chromaticities. For example, the color filter may have a first color material portion corresponding to the transmissive display region T and a second color material portion corresponding to the reflective display region R. In this instance, the first color material portion may have a higher chromaticity than the second color material portion so that the chromaticity of light can be prevented from varying between the transmissive display region T where the light is transmitted through the color filter 22 only once and the reflective display region R where the light is transmitted through the color filter 22 twice, thus matching the appearances of images between the transmissive mode and the reflective mode.

A functional resin layer 21 is formed on the inner side of the color filter 22 across both the transmissive display region T and the reflective display region R. The functional resin layer 21, in the present embodiment, gives a phase difference of about half wavelength ($\lambda/2$) to light vibrating in the direction parallel to the optical axis direction (slow axis direction), and is a so-called inner retardation layer, which is disposed at the inner side of the base 20A. The functional resin layer 21 includes a first functional resin sub layer 21A formed in the reflective display region R and a second functional resin sub layer 21B formed in the transmissive display region T. The first functional resin sub layer 21A has an optical axis extending in a direction different from the optical axis of the second functional resin sub layer 21B, so that the first and the second functional resin sub layer have different optical functions for light coming through the opposing substrate 20. The end of the second functional resin sub layer 21B opposite the first functional resin sub layer 21A overlaps with the black matrix BM.

The functional resin layer 21 can be formed by applying a solution of polymer liquid crystal or liquid crystalline monomer onto an alignment layer and orienting the liquid crystal molecules in a predetermined direction while the solution is being dried and solidified. More specifically, an alignment layer (not shown) is formed in the transmissive display region T and the reflective display region R, and the alignment layer is subjected to mask rubbing or photo-alignment so that the transmissive display region and the reflective display region have different orientations (orientation segmentation). A liquid crystalline monomer for the functional resin layer, which is a polymerizable liquid crystal material, is applied onto the alignment layer. The applied material is exposed to UV light to polymerize in an oriented state (in a liquid crystal phase). Thus, a functional resin layer can be formed which has different optical characteristics between the reflective display region R and the transmissive display region T. This method allows the liquid crystal molecules to be aligned in different directions between the reflective display region R and the transmissive display region T. Accordingly, the optical axes of the first functional resin sub layer 21A and the second functional resin sub layer 21B overlying the liquid crystal layer can point in different directions. The functional resin layer 21 can be formed in one body in the transmissive display region T and the reflective display region R. This makes the process simpler and easier than the case where two types of functional resin layer are formed individually. The phase difference given to transmitted light by first functional resin sub layer 21A and the second functional resin sub layer 21B can be adjusted by changing the type of liquid crystalline monomer and the thickness of the first and second functional resin sub layers 21A and 21B.

A liquid crystal layer thickness-adjusting layer 23 is selectively formed in the reflective display region R on the functional resin layer 21 so that the thickness of the liquid crystal layer 50 in the reflective display region R can be smaller than that in the transmissive display region T. In the transflective liquid crystal display device, light entering the reflective display region R is transmitted through the liquid crystal layer 50 twice, while light entering the transmissive display region T is transmitted through the liquid crystal layer 50 only once. This makes the retardation of the liquid crystal layer 50 different between the reflective display region R and the transmissive display region T and produces a difference in light transmittance, consequently hindering the display of uniform images. The liquid crystal layer thickness-adjusting layer 23 provides a multi-gap structure. More specifically, the thickness of the liquid crystal layer 50 in the reflective display region R is about half that in the transmissive display region T, so that the retardations of the liquid crystal layer 50 in the reflective display region R and in the transmissive display region T can be set substantially the same. Thus, the liquid crystal display device can display uniform images in both the reflective display region R and the transmissive display region T.

The liquid crystal layer thickness-adjusting layer 23 and the functional resin layer 21 are covered with an alignment layer 28 made of, for example, polyimide or silicon oxide. In addition, polarizers 14 and 24 are provided on the outer surfaces of the bases 10A and 20A respectively. The polarizer 14 and the base 10A, and the polarizer 24 and the base 20A may be separated by at least one retardation film (optical compensation film).

FIG. 2B shows optical axes in the liquid crystal display device of the present embodiment. The transmission axis 153 of the polarizer 14 of the TFT array substrate 10 is perpendicular to the transmission axis 155 of the polarizer 24 of the opposing substrate 20, and the transmission axis 153 forms an angle of about 15° clockwise with the Y axis. The alignment layers 18 and 28 are subjected to rubbing in the same direction, or in the rubbing direction 151 shown in FIG. 2B, and this direction is parallel to the transmission axis 153 of the polarizer 14 forming an angle of about 15° with the Y axis. The rubbing direction 151 is not limited to the direction shown in FIG. 2B, but intersects (not parallel to) the main direction 157 of the electric field generated between the pixel electrode 9 and the common electrode 19. In the present embodiment, the electric field direction 157 is parallel to the X axis direction. The first functional resin sub layer 21A is oriented in such a direction as its slow axis 158 forms an angle of 68° anticlockwise with the transmission axis 153 of the polarizer 14. The second functional resin sub layer 21B has a slow axis 159 parallel to the transmission axis 155 of the polarizer 24. The direction of the slow axis 159 of the second functional resin sub layer 21B is not limited to the direction shown in FIG. 2B, but is at least substantially parallel or perpendicular to the transmission axis 155 of the polarizer 24. This arrangement of the optical axes prevents undesired phase difference of light transmitted through the second functional resin sub layer 21B, which causes the decrease in contrast. Consequently, high-contrast images with a wide viewing angle can be displayed in the transmissive mode. In the reflective mode, the functional resin layer 21A serves as the retardation layer to give a necessary phase difference, and consequently high-contrast images with a wide viewing angle can be displayed.

For convenience, in FIG. 2B, the initial orientation direction of the liquid crystal molecules in the liquid crystal layer 50 in the vicinity of the alignment layers 18 and 28 is parallel to the rubbing direction. However, the orientation of the liquid crystal molecules of the alignment layers 18 and 28 is not necessarily set initially by rubbing. For example, the orientation of the liquid crystal molecules of the alignment layers may be set initially by photo-alignment or oblique evaporation.

FIG. 4A is a schematic sectional view of the TFT array substrate 10 taken along line B-B' of FIG. 2A, and FIG. 4B shows the measurement results of electrooptical characteristics of the liquid crystal display device 100. The transmittance and the reflectance shown in FIG. 4B are normalized in such a manner that the maximum transmittance and the maximum reflectance are 1. The measurement was performed using the TFT array substrate 10 shown in FIG. 4A, where the strips (branches) 9c extend in parallel from the basic portion 9a at intervals w2 of 5 μm and have a width w1 of 3 μm, and where the second insulating interlayer 13 has a thickness d1 of 0.5 μm and a relative dielectric constant ε of 7.

The liquid crystal layer has a thickness (cell gap) of 3.5 μm in the transmissive display region T, and a thickness of 1.4 μm in the reflective display region R (the liquid crystal layer thickness-adjusting layer 23 has a thickness of 2.1 μm). The relative dielectric constant of the liquid crystal is $\epsilon_{//}=10$ and $\epsilon_{\perp}=4$, and Δn is 0.1.

FIG. 4B shows that in the liquid crystal display device of the present embodiment, the transmittance in the transmissive mode and the reflectance in the reflective mode increase in substantially the same manner as the applied voltage is increased in the range of voltages generally used for driving the liquid crystal (0 to 5 V), and that the changes in transmittance and reflectance with voltage are substantially the same. Accordingly, the liquid crystal display device of the present embodiment can display white, black, and middle tones with high quality in both the reflective mode and the transmissive mode.

In the liquid crystal display device of the present embodiment, the first functional resin sub layer 21A is formed in the reflective display region R, and the liquid crystal layer thickness-adjusting layer 23 is provided so that the liquid crystal layer thickness is reduced to 1.4 μm (Δn·d=140 nm) in the reflective display region R. As a result, the polarizer 24, the first functional resin sub layer 21A, and the liquid crystal layer 50 in the reflective display region R can produce broadband circularly polarized light, so that all the external light reaching the reflection layer 29 turns to substantially circularly polarized light in the range of visible wavelengths. Thus, high-contrast images can be displayed in the reflective mode.

In the transmissive display region T, the slow axis of the second functional resin sub layer 21B is set to be parallel to the transmission axis of the polarizer 24 to prevent phase difference. Consequently, high-contrast images with a high viewing angle can be displayed in the transmissive mode as with conventional transmissive liquid crystal display devices.

In the present embodiment, light from the backlight enters the TFT array substrate 10, and light to be reflected enters the opposing substrate 20 (opposing the substrate having the reflection layer 29), with the reflection layer 29 in the TFT array substrate 10 and the functional resin layer 21 in the opposing substrate 20. However, light from the backlight may enter the opposing substrate 20 and light to be reflected may enter the TFT array substrate 10, with the reflection layer 29 in the opposing substrate 20 and the functional resin layer 21 in the TFT array substrate.

Second Embodiment

A second embodiment will now be described with reference to some of the drawings.

Figure 5:
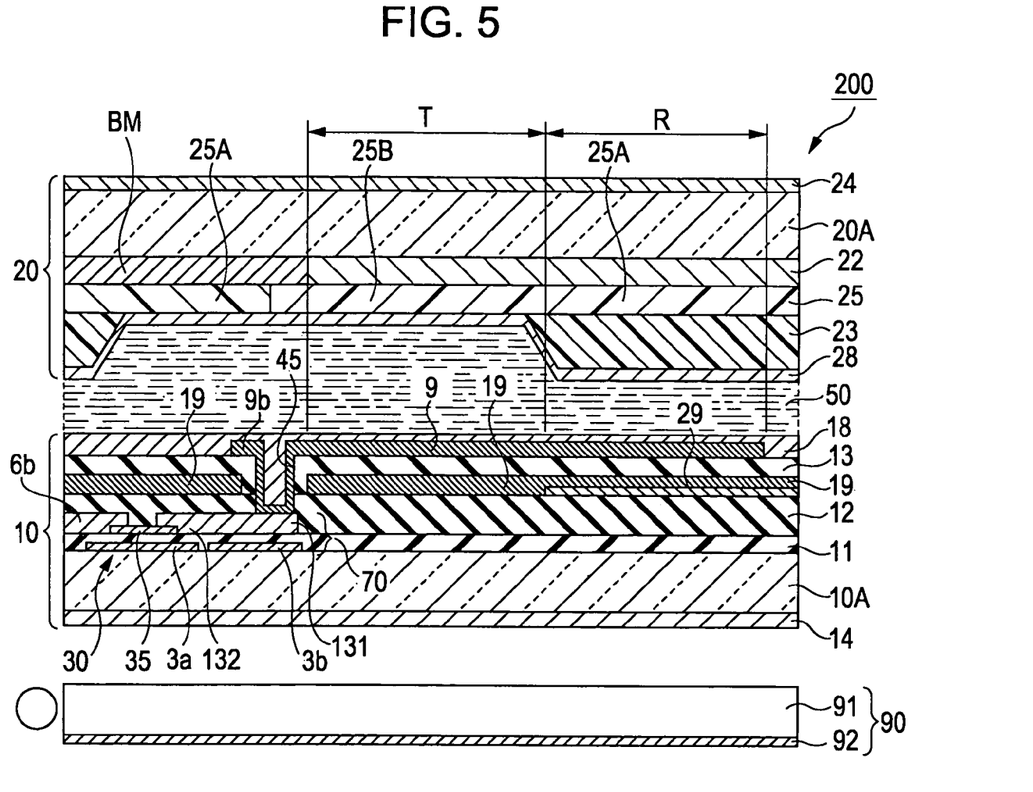
FIG. 5 is a fragmentary sectional view of a liquid crystal display device according to a second embodiment.

FIG. 5 is a sectional view of a sub-pixel region of a liquid crystal display device 200 according to the second embodiment.

The liquid crystal display device 200 of the second embodiment has nearly the same structure as the liquid crystal display device 100 of the first embodiment. The difference from the liquid crystal display device 100 is only that the functional resin layer 25B in the transmissive display region is an isotropic layer having no phase difference. Hence, the plan view of the sub-pixel region and its optical axis arrangement are completely the same as in the first embodiment, and are therefore omitted. The same parts in FIG. 5 as in FIGS. 1 to 4 are designated by the same numerals and the description is not repeated.

As shown in FIG. 5, a functional resin layer 25 is provided on the inner side of the color filter 22 across both the transmissive display region T and the reflective display region R. The first functional resin sub layer 25A in the reflective display region R of the functional resin layer 25 gives a phase difference of about half wavelength (λ/2) to light vibrating in the direction parallel to the optical axis direction (slow axis direction), and is called an inner retardation layer. In the second functional resin sub layer 25B in the transmissive display region T, the liquid crystalline monomer, which is the material of the functional resin layer 25, is oriented in a random manner. Thus the second functional resin sub layer 25B is an isotropic layer giving no phase difference to light transmitted through it.

The functional resin layer 25 can be formed by applying a liquid crystalline monomer solution onto an alignment layer, and polymerizing the liquid crystalline monomer in the transmissive display region T and then in the reflective display region R by mask exposure while curing the resin in the two regions at different temperatures. Specifically, an alignment layer (not shown) is formed in the transmissive display region T and the reflective display region R, and is oriented in the same direction in the transmissive display region T and the reflective display region R by, for example, rubbing. Then, a liquid crystalline monomer (polymerizable liquid crystal material) for forming a functional resin layer is applied onto the alignment layer through a photomask. The monomer in the reflective display region R is first polymerized around room temperature at which the monomer becomes in a nematic phase (liquid crystal phase). After the photomask is removed, the liquid crystalline monomer in the transmissive display region T is polymerized around 100° C. at which the monomer becomes isotropic. Thus, a functional resin layer can be formed which has different optical characteristics between the reflective display region R and the transmissive display region T.

The optical effect of the second functional resin sub layer 25B is the same as in the first embodiment. However, the second embodiment does not require orientation segmentation of the underlying alignment layer for orientation of the liquid crystalline monomer. Accordingly, the manufacturing process can be simplified more than that in the first embodiment.

Electronic Apparatus

Figure 6:
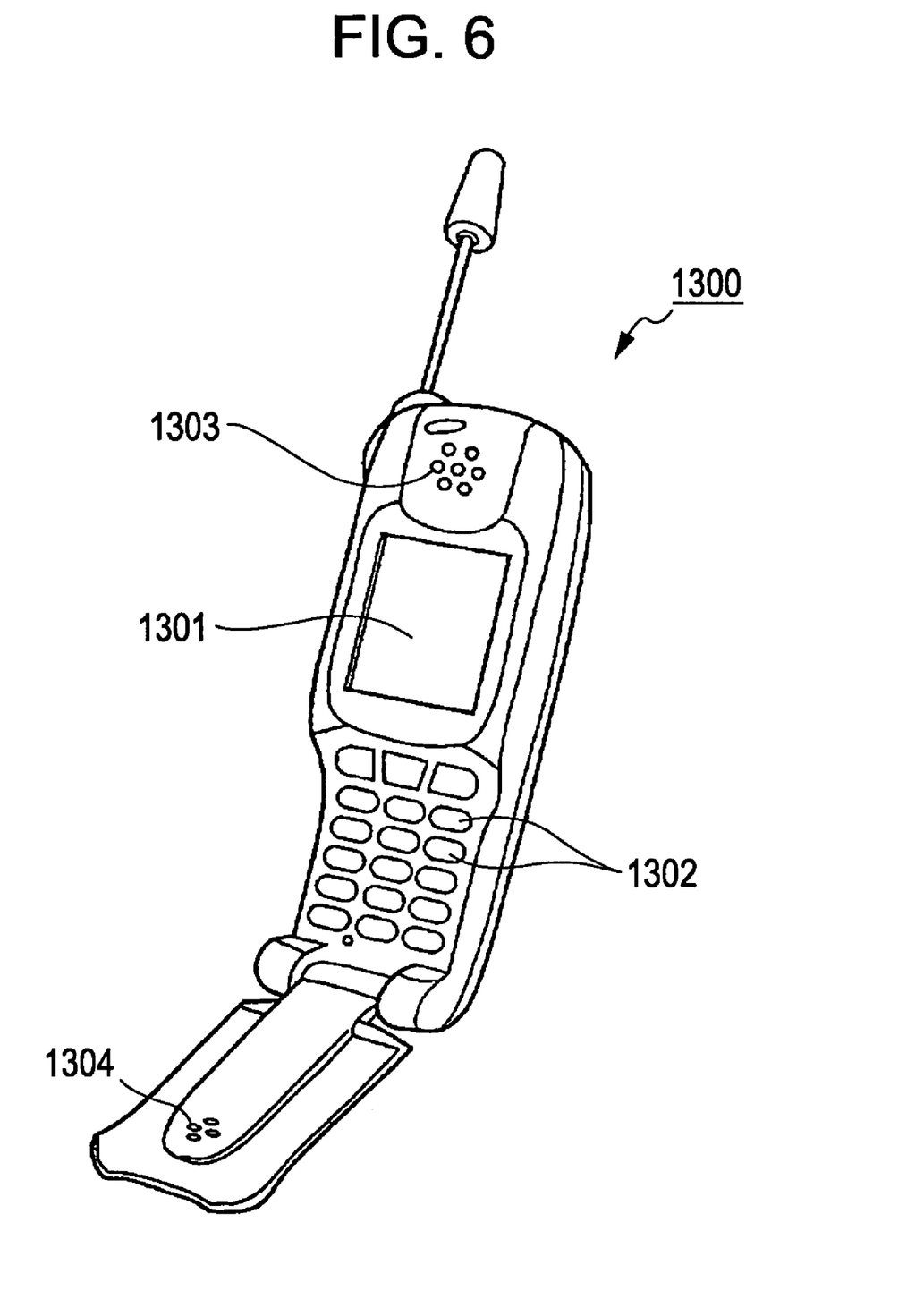
FIG. 6 is a perspective view of an electronic apparatus.

FIG. 6 is a perspective view of a cellular phone being an electronic apparatus including a liquid crystal display device according to an embodiment of the invention. The cellular phone 1300 uses a liquid crystal display device according to an embodiment of the invention as a small display 1301, and further includes a plurality of control buttons 1302, an ear piece 1303, and a mouthpiece 1304.

In addition to the cellular phone, the liquid crystal display device can be used as a display of many types of apparatus, such as electronic books, personal computers, digital still cameras, liquid crystal TV sets, viewfinder-type and monitor-direct-view-type video tape recorders, car navigation systems, pagers, electronic notebooks, electronic calculators, word processors, work stations, videophones, POS terminals, and other apparatuses with touch panels. In any of the electronic apparatuses, the liquid crystal display device can display high-contrast images with a wide viewing angle in both the transmissive mode and the reflective mode.

While the invention has been described herein using preferred embodiments with reference to the attached drawings, it will be readily appreciated by those skilled in the art that various modifications in form and detail may be made without departing from the scope and sprit of the invention.

For example, although the common electrode 19 of the above embodiments spreads substantially evenly in a plane and the pixel electrode 9 has a plurality of strips c, the forms of the electrodes are not limited to these. Specifically, the common electrode 19 and the pixel electrode 9 may each have a plurality of strips; hence a transverse electric field type can be applied in which an electric field is generated in a structure where the common electrode 19 and the pixel electrode 9 adjacently oppose each other in a layer. For example, the common electrode and the pixel electrode each may have a comb shape with teeth, and the teeth, or the strips, of both electrodes are alternately arranged. Even if the shapes of the electrodes are thus changed, the same effect as in the above embodiments can be produced.

The entire disclosure of Japanese Patent Application No. 2006-029340, filed Feb. 7, 2006 is expressly incorporated by reference herein.

What is claimed is:

1. A liquid crystal display device whose sub-pixel region has a reflective display region that displays an image in a reflective mode and a transmissive display region that display an image in a transmissive mode, the liquid crystal display device comprising:
    a first substrate;
    a second substrate opposing the first substrate;
    a polarizer disposed above the second substrate; and
    a liquid crystal layer between the first substrate and the second substrate, the liquid crystal layer having a smaller thickness of about one half in the reflective display region than in the transmissive display region,
    one of the first substrate and the second substrate including a reflection layer in the reflective display region, and the other substrate including on a liquid crystal layer side a functional resin layer having a first functional resin sub layer in the reflective display region and a second functional resin sub layer in the transmissive display region,
    a thickness adjustment layer being formed directly on the first functional resin sub layer, and an alignment layer formed to cover the thickness adjustment layer in the reflective display region and to cover the second functional resin sub layer in the transmissive display region,
    the second functional resin sub layer being isotropic and applying no phase difference to transmitted light, the second functional resin sub layer having a slow axis parallel to a transmission axis of the polarizer; and
    the first functional resin sub layer serving as a retardation layer and applying a phase difference to transmitted light, the first functional resin sub layer having a slow axis forming an angle of about 68° relative to the transmission axis of the polarizer.

2. The liquid crystal display device according to claim 1, the first functional resin sub layer being formed by polymerizing a polymerizable liquid crystal material in a liquid crystal phase, and the second functional resin sub layer being formed by polymerizing the polymerizable liquid crystal material in an isotropic phase.

3. The liquid crystal display device according to claim 1, the first substrate including a first electrode and a second electrode at the liquid crystal layer side between which an electric field is generated to drive the liquid crystal layer, and the second substrate having the functional resin layer.

4. The liquid crystal display device according to claim 1, the liquid crystal layer in the reflective display region giving a phase difference of about $\lambda/4$ to incident light in an inactive state.

5. An electronic apparatus comprising the liquid crystal display device as set forth in claim 1.

* * * * *